J. F. RODGERS.
Gate.
No. 83,550.
Patented Oct. 27, 1868.
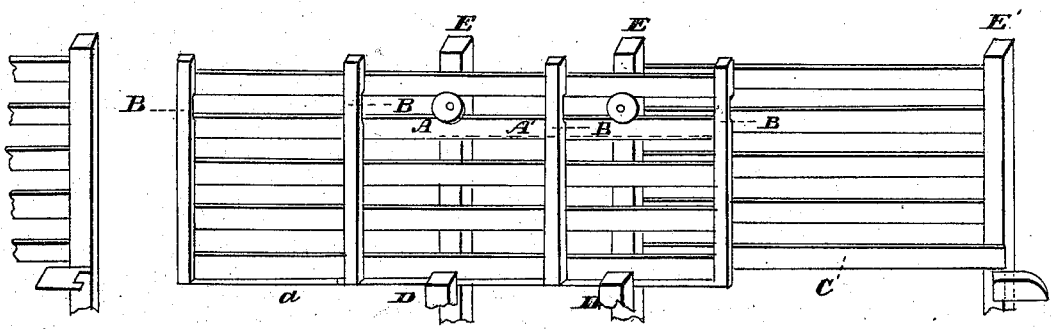
Witnesses:
R. J. Chenedwood
E. Green
Inventor:
John F. Rodgers

JOHN F. RODGERS, OF SOUTH BEND, INDIANA.

Letters Patent No. 83,550, dated October 27, 1868.

IMPROVEMENT IN GATES.

The Schedule referred to in these Letters Patent and making part of the same.

*To all whom it may concern:*

Be it known that I, JOHN F. RODGERS, of the city of South Bend, county of St. Joseph, and State of Indiana, have invented a new Improvement in a Gate for Carriage-Way or Farm; and I hereby do declare that the following is a full and exact description thereof, reference being had to the accompanying drawings, and to the letters of reference marked thereon.

My improvement consists in placing two sheaves or flanged pulleys, four to six inches in diameter, about half the distance apart of the opening required for the gate. These pulleys are placed in a horizontal position, at any required height. The gate is made of sufficient length to close the opening, and embrace the pulleys A A between two bars or slats of the gate. These bars or slats are so arranged that the pulleys will pass freely between them, so that the gate will easily move the whole distance of the opening, and be kept in a horizontal position. A recess is made in the upright parts of the gate, to allow the flange of the pulleys to pass, as seen at B B B B.

The posts E E support the rollers A A, and are united by a short bar, A', shown by dotted lines.

A bar to support the lateral pressure of the gate is shown at a, and the bar C forms a guide for the tail-end of the gate.

The short posts, D D, serve as a guide to the gate, and prevent the bottom from swinging outward.

What I claim as my improvement, and desire to secure by Letters Patent, is—

A gate, constructed as described, having the rail, a, for sustaining the lateral pressure, placed at the bottom of the gate, in combination with the short post D, the rollers A, their supporting-posts E, and connecting-bar A', and posts E', all constructed and arranged as and for the purpose set forth.

Witnesses:         JOHN F. RODGERS.
  R. J. CHESNUTWOOD,
  E. GREEN.